US007909398B2

(12) United States Patent
Ling

(10) Patent No.: US 7,909,398 B2
(45) Date of Patent: Mar. 22, 2011

(54) AIRCRAFT PASSENGER SEAT WITH A DISPLAY MONITOR INCLUDING A READING LIGHT

(75) Inventor: Sieak Chern Ling, Singapore (SG)

(73) Assignee: Singapore Airlines Limited, Airline House (SG)

( * ) Notice: Subject to any disclaimer, the term of this patent is extended or adjusted under 35 U.S.C. 154(b) by 162 days.

(21) Appl. No.: 11/665,497

(22) PCT Filed: Oct. 14, 2005

(86) PCT No.: PCT/SG2005/000355
§ 371 (c)(1),
(2), (4) Date: Jul. 20, 2007

(87) PCT Pub. No.: WO2006/041417
PCT Pub. Date: Apr. 20, 2006

(65) Prior Publication Data
US 2008/0136230 A1 Jun. 12, 2008

(30) Foreign Application Priority Data
Oct. 14, 2004 (AU) .............................. 2004905972

(51) Int. Cl.
*A47C 7/72* (2006.01)
(52) U.S. Cl. .................................................. 297/217.6
(58) Field of Classification Search ............... 297/217.6, 297/391, 217.3
See application file for complete search history.

(56) References Cited

U.S. PATENT DOCUMENTS

| 1,704,415 | A | * | 3/1929 | Wenegrat | 297/217.6 |
| 2,514,322 | A | * | 7/1950 | Flogaus | 362/483 |
| 3,019,050 | A | * | 1/1962 | Spielman | 297/217.3 |
| RE33,423 | E | | 11/1990 | Lobanoff | |
| 5,529,265 | A | * | 6/1996 | Sakurai | 244/118.5 |
| 6,126,233 | A | * | 10/2000 | Gaetano et al. | 297/217.6 |
| 6,199,999 | B1 | * | 3/2001 | Cotton, Jr. | 362/131 |
| 6,394,551 | B1 | * | 5/2002 | Beukema | 297/391 |
| 6,428,096 | B2 | * | 8/2002 | Reitze | 297/217.6 |
| 6,554,437 | B2 | | 4/2003 | von Glasow | |
| 6,994,401 | B1 | * | 2/2006 | Fischer et al. | 297/452.14 |
| 7,261,266 | B2 | * | 8/2007 | Satterfield | 248/284.1 |
| 2003/0235320 | A1 | | 12/2003 | Hirschhorn | |
| 2004/0227861 | A1 | * | 11/2004 | Schedivy | 348/837 |

FOREIGN PATENT DOCUMENTS
JP 1094049 A 4/1989

OTHER PUBLICATIONS
Written Opinion dated Sep. 22, 2008.

* cited by examiner

Primary Examiner — Peter R. Brown
(74) Attorney, Agent, or Firm — Sughrue Mion, PLLC

(57) ABSTRACT

A personalised reading light (11) for aircraft passenger seats (3) is disclosed. The reading light forms part of a personalised visual display monitor assembly (5) that is mounted to a back (7) of a passenger seat. The reading light is mounted to direct light rearwardly into a space immediately in front of a passenger facing the seat back. In one embodiment the assembly is adjustable in relation to the seat back and the reading light is adjustable in relation to other components of the assembly. Consequently, the direction of the light can be varied considerably.

22 Claims, 4 Drawing Sheets

AIRCRAFT PASSENGER SEAT WITH A DISPLAY MONITOR INCLUDING A READING LIGHT

The present invention relates to personal reading lights for passengers in aircraft.

The present invention also relates to aircraft that include personal reading lights for passengers.

It is known to provide personal reading lights for passengers in aircraft.

One widely used known type of passenger reading lights on commercially operating aircraft is mounted on the roof of a passenger cabin of the aircraft, with a separate light for each passenger seat that can be operated by a passenger in the seat via a switch on the arm rest of the seat.

One disadvantage of roof-mounted reading lights arises from the fact that the lights are spaced well away from passengers. Consequently, the reading lights are clearly visible to other passengers and can be an inconvenience to the passengers.

Another disadvantage of roof-mounted reading lights is that, notwithstanding attempts to confine the area that is illuminated by each light to the particular passenger seat associated with the light, invariably the lights illuminate a wider area than the particular passenger seats and can be an inconvenience to other passengers in the immediate vicinity of the light.

One other known, more personalised, type of reading light than the reading light described in the preceding paragraphs that is also used on commercially operating aircraft is in the form of a light that is mounted on the end of a flexible arm that can be bent by a passenger from an inoperative position to one side and behind the shoulder of the passenger, typically in the space between adjacent passenger seats, to an operative position in which the arm directs light downwardly from above the shoulder of the passenger in a required direction.

This type of reading light is less visible to passengers in an aircraft cabin in general and has less impact on passengers in the immediate vicinity of the light in particular.

However, this type of reading light tends to be a low intensity light only and thus relies on being very close to a passenger in order to be useful. Thus, this type of reading light is of little, if any, benefit in other situations, for example, when a passenger requires light to be projected onto a tray table.

One other known type of reading light for passengers that is disclosed in the patent literature is mounted to a back of a passenger seat and is arranged to direct light rearwardly into a space in front of a passenger who is seated in a passenger seat immediately behind the seat back.

This type of reading light is close to the passenger and is not generally visible to other passengers in an aircraft cabin and is well placed to illuminate a tray table. In addition, the light can illuminate a confined area that enables the passenger to read comfortably but without inconveniencing passengers in the immediate vicinity of the light, such as in adjacent seats.

However, the proposals for this type of reading light in the patent literature are confined to mounting the reading light directly to seat backs and the light is not adjustable and therefore the light from the reading light is not always projected into areas that are required by different passengers. Belgium patent application 868863 in the name of Vogel I. GmbH is an example of this type of reading light.

The present invention provides an improved personalised reading light and an aircraft that includes the reading light.

The personalised reading light of the present invention is of the above-described type that is mounted to the back of a passenger seat, which can be described as a "front seat", and is arranged to direct light rearwardly into a space in front of a passenger who is seated in a passenger seat immediately behind the front seat, which can be described as a "rear seat". In particular, the reading light of the present invention forms part of a personalised visual display monitor assembly that is mounted to the back of the front seat.

In general terms, the present invention provides an aircraft that includes an aircraft passenger cabin, a plurality of passenger seats arranged in rows in the cabin, with at least one passenger seat including a personalized visual display monitor assembly mounted to a back of the seat for use by a passenger when the passenger is seated in a seat immediately behind the passenger seat, and with the visual display monitor assembly including a personalised reading light for the passenger facing the seat back.

In particular, in accordance with the present invention, the reading light is adjustable so that the direction of light from the reading light can be adjusted as required depending on circumstances, such as the required viewing area for the passenger facing the seat back and the angle of inclination of the front seat.

Preferably the reading light is adapted to direct light rearwardly from the seat into a space immediately in front of the passenger facing the seat back.

Preferably the reading light is mounted so that the direction of light from the reading light can be adjusted upwardly and downwardly about a horizontal axis within a range of angle.

Preferably the reading light is adjustable with respect to other components of the visual display monitor assembly, thereby to facilitate adjustment of the direction of light from the reading light.

Preferably the visual display monitor assembly is mounted to the back of the seat so that the assembly is adjustable with respect to the seat, thereby to facilitate adjustment of the direction of light from the reading light. The adjustable mounting of the assembly to the seat means that the direction of light from the reading light can be adjusted over a wider range of angles than in a situation in which the assembly is fixed with respect to the seat.

Preferably the visual display monitor assembly is mounted for pivotal movement to the seat and the position of the assembly with respect to the seat can be pivoted between a first retracted position in which the assembly is generally parallel to the back of the seat and a second pivoted position in which the assembly is at an angle with respect to the back of the seat.

The reading light may be of any suitable type.

Preferably the reading light includes a plurality of light emitting diodes.

More preferably the reading light includes a plurality of light emitting diodes arranged in a line.

Preferably the reading light includes a tubular housing for the line of light emitting diodes and the housing is mounted to the back of the seat for rotation about the lengthwise extending axis of the tube, thereby to facilitate adjustment of the direction of light from the reading light.

Preferably the reading light includes a mask that is adapted to confine the light projected by the light to a well-defined beam. In effect, the mask blocks stray light from being projected beyond defined boundaries.

Preferably the reading light includes an image directing film to shift the light focus in any desired direction. An example of an image directing film is a 3M product called Vikuity (Trade Mark) image directing film. It is a 0.15 mm thick film that re-directs any image or light source by 20°.

Preferably the reading light includes a lens that collects wasted light that is projected off the sides and redirects the light onto a desired surface. This feature solves two problems, namely reducing stray light and increasing the brightness on a desired surface.

Preferably the visual display monitor assembly includes a liquid crystal display monitor assembly.

Preferably the visual display monitor assembly and the reading light are powered by a common electrical circuit.

In addition, in general terms, the present invention provides a passenger seat for an aircraft that includes a personalized visual display monitor assembly mounted to a back of the seat for use by a passenger when the passenger is seated in a seat immediately behind the passenger seat, the visual display monitor assembly including a personalised reading light for the passenger facing the seat back.

In addition, in particular, in accordance with the present invention, the reading light is adjustable so that the direction of light from the reading light can be adjusted as required depending on circumstances, such as the required viewing area for the passenger facing the seat back and the angle of inclination of the seat.

Preferably the reading light is adapted to direct light rearwardly from the passenger seat into a space immediately in front of the passenger facing the seat back.

Preferably the reading light is mounted so that the direction of light from the reading light can be adjusted upwardly and downwardly about a horizontal axis within a range of angles.

Preferably the reading light is adjustable with respect to other components of the visual display monitor assembly, thereby to facilitate adjustment of the direction of light from the reading light.

Preferably the visual display monitor assembly is mounted to the back of the seat so that the assembly is adjustable with respect to the seat, thereby to facilitate adjustment of the direction of light from the reading light. The adjustable mounting of the assembly to the seat means that the direction of light from the reading light can be adjusted over a wider range of angles than in a situation in which the assembly is fixed with respect to the seat.

Preferably the visual display monitor assembly is mounted for pivotal movement to the seat and the position of the assembly with respect to the seat can be pivoted between a first retracted position in which the assembly is generally parallel to the back of the seat and a second pivoted position in which the assembly is at an angle with respect to the back of the seat.

The reading light may be of any suitable type.

Preferably the reading light includes a plurality of light emitting diodes.

More preferably the reading light includes a plurality of light emitting diodes arranged in a line.

Preferably the reading light includes a tubular housing for the line of light emitting diodes and the housing is mounted to the back of the seat for rotation about the lengthwise extending axis of the tube, thereby to facilitate adjustment of the direction of light from the reading light.

Preferably the reading light includes a mask that is adapted to confine the light projected by the light to a well-defined beam.

Preferably the reading light includes an image directing film to shift the light focus in any desired direction.

Preferably the reading light includes a lens that collects wasted light that is projected off the sides and redirects the light onto a desired surface.

Preferably the visual display monitor assembly includes a liquid crystal display monitor assembly.

Preferably the visual display monitor assembly and the reading light are powered by a common electrical circuit.

The present invention is described further with reference to the accompanying drawings, of which:

Figure 1:
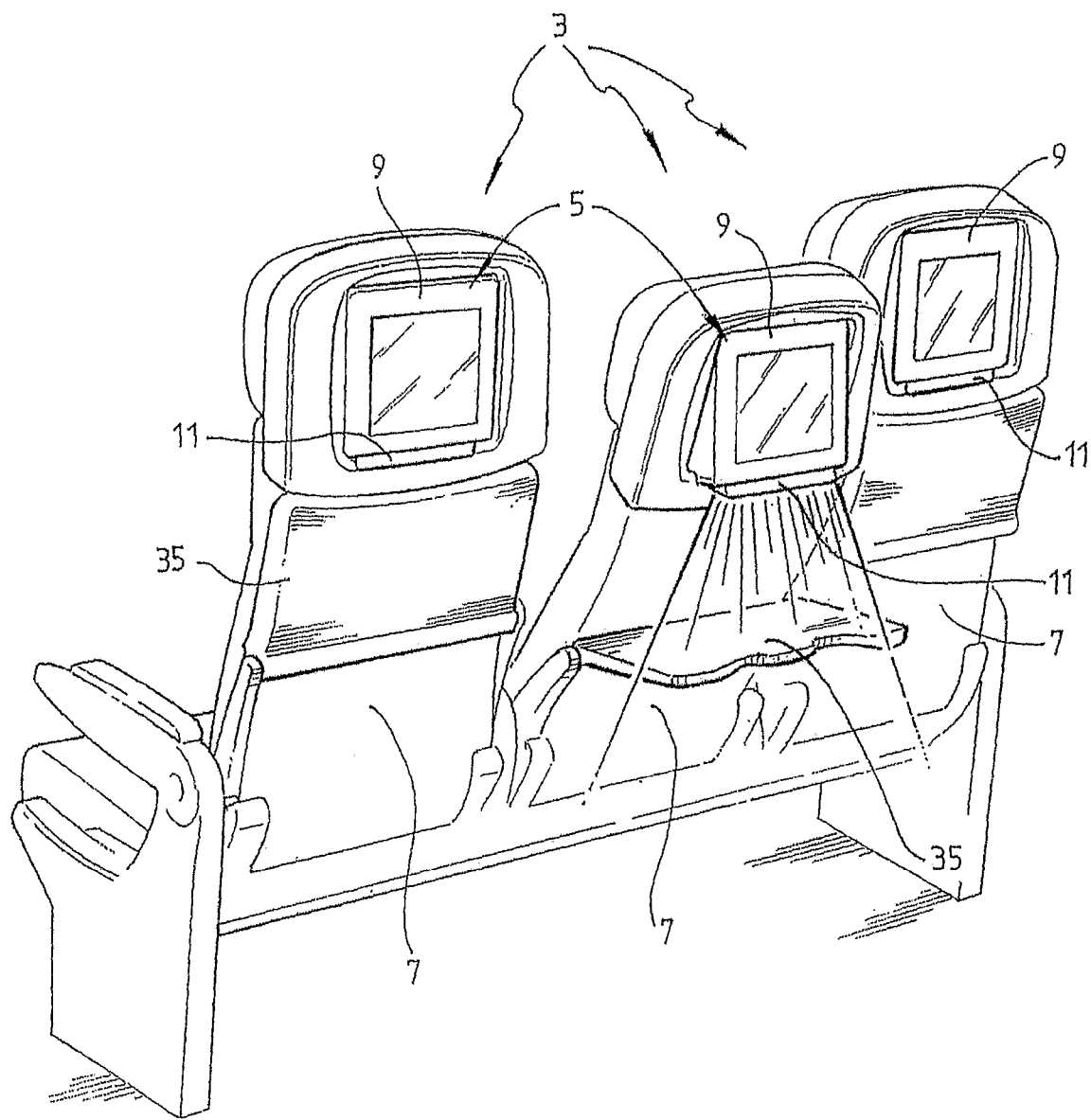
FIG. 1 is a perspective view of the back of a row of three aircraft seats in accordance with one embodiment of the present invention.

FIG. 1 shows a row of three aircraft passenger seats 3. The seats 3 form part of a cabin of an aircraft. The aircraft and the aircraft cabin can be of any configuration. The seats 3 are standard aircraft seats in the sense that the backs 7 of the seats 3 are adjustable between an upright position (the two outer seats) and a fully reclined position (the central seat).

One feature of the seats 3, which is a relatively recent innovation for aircraft passenger seats but is being used increasingly on aircraft, is that visual display monitors in the form of liquid crystal display monitor assemblies, generally identified by the numeral 5, are mounted to the backs 7 of the seats 3.

Each liquid crystal display monitor assembly 5 is coupled to the in-flight entertainment system of the aircraft and includes a monitor 9 for viewing movies and playing video games, etc, by selection of the passenger.

Figure 2:
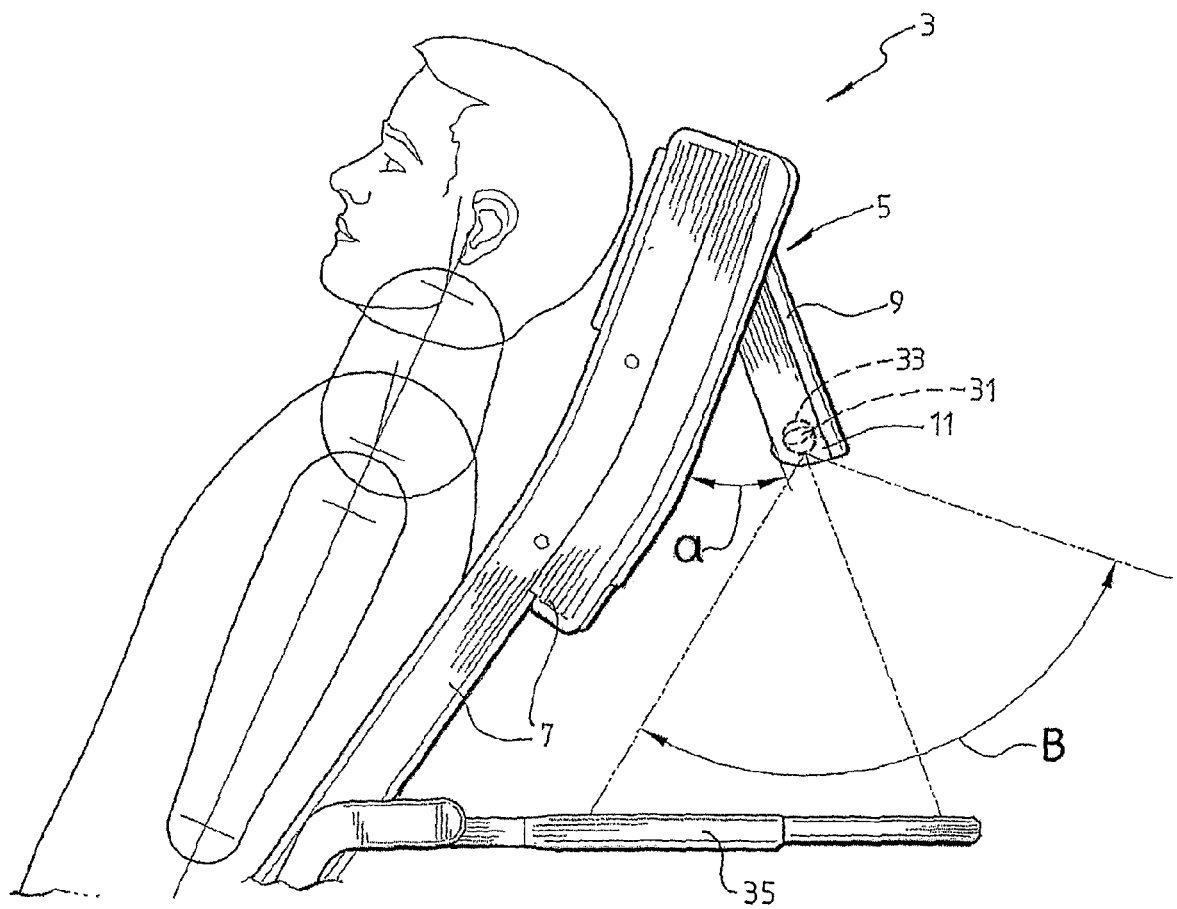
FIG. 2 is a side elevation of an upper part of the middle seat shown in FIG. 1 that illustrates in more detail the visual display monitor that forms part of the aircraft seats shown in FIG. 1, with the monitor in an extended position.

An upper end of each assembly 5 is pivotally mounted to the seat 3 so that the assembly 5 can be swung between a retracted position in which the assembly is flush with the seat back 7, as illustrated by the two outer seats 3 in FIG. 1, and an extended position in which the assembly is at an angle with respect to the seat back 7, as illustrated by the middle seat 3 in FIG. 1 and in FIG. 2.

The pivot mechanism between each assembly 5 and the seat 3 may be of any suitable type.

In the arrangement shown in the Figures, the seat back 7 includes a pair of support plates 21 mounted to the seat back 7 on opposite sides of the assembly 5, and each plate 21 includes a curved opening 19. In addition, the assembly 5 includes a U-shaped support bracket 13 that has sides 15, and each side 15 has an outwardly extending pin 17. The support plates 21 and the sides 15 of the bracket 13 are positioned so that the pins 17 extend into the curved openings 19. The openings 19 define guide channels for the pins 17. It can readily be appreciated that this arrangement supports the assembly 5 for pivoting movement, with the extent of the movement being limited by the arc of the curved openings 19

In the Figures the curved openings 19 permit each assembly 5 to pivot 30° with respect to the seat back 7. This pivot range is shown by the arc "α" in FIG. 1.

In accordance with the embodiment of the present invention shown in the Figures, each assembly 5 further includes a reading light, generally identified by the numeral 11, mounted to a lower end of the monitor 9.

Specifically, each reading light 11 includes a line of light emitting diodes 31 positioned in a transparent tube 33.

The light emitting diodes 31 are powered by the same electrical circuit that powers the monitor 9.

The tube 33 houses and supports the diodes 31. In particular, the tube 33 is mounted to the monitor 9 to rotate about the axis of the tube 33 and thereby selectively direct the light with respect to the monitor 9. The pivot range is shown by the arc "β" in FIG. 1.

Figure 3:
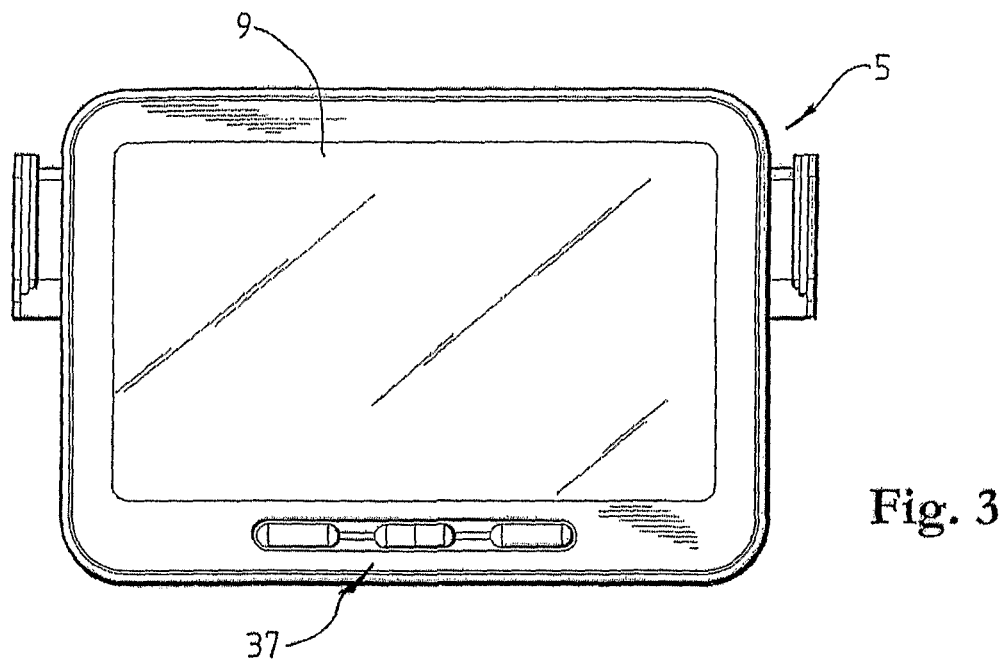
FIG. 3 is a front view of the visual display monitor shown in FIGS. 1 and 2.
Figure 4:
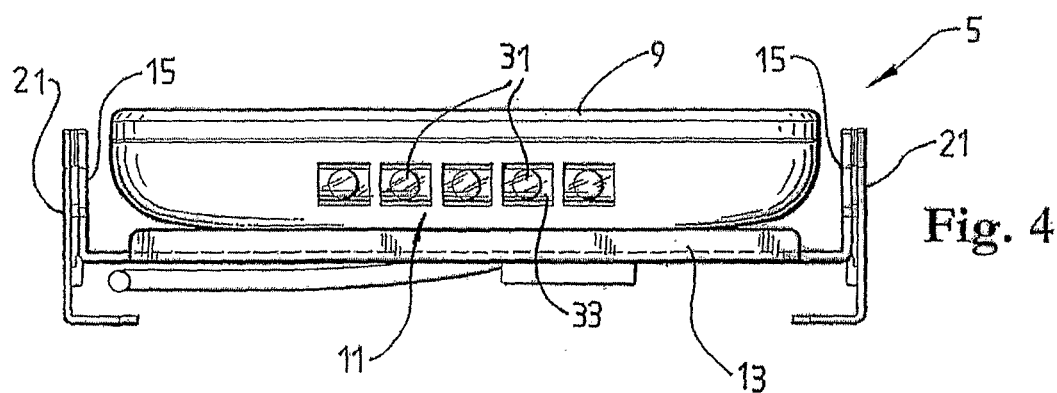
FIG. 4 is an underside view of the visual display monitor shown in FIGS. 1 to 3, with the monitor in a retracted position.
Figure 5:
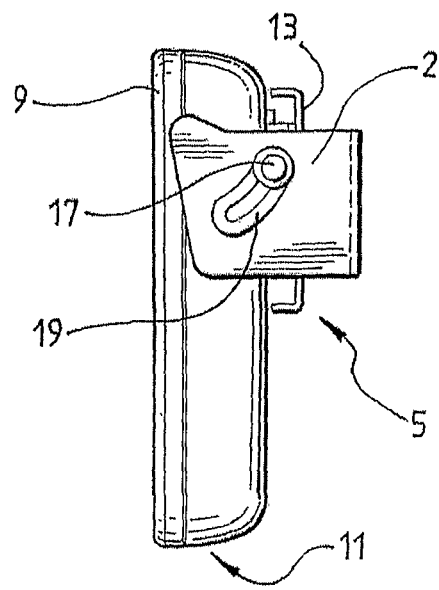
FIG. 5 is a side view of the visual display monitor shown in FIG. 4 in the retracted position.
Figure 6:
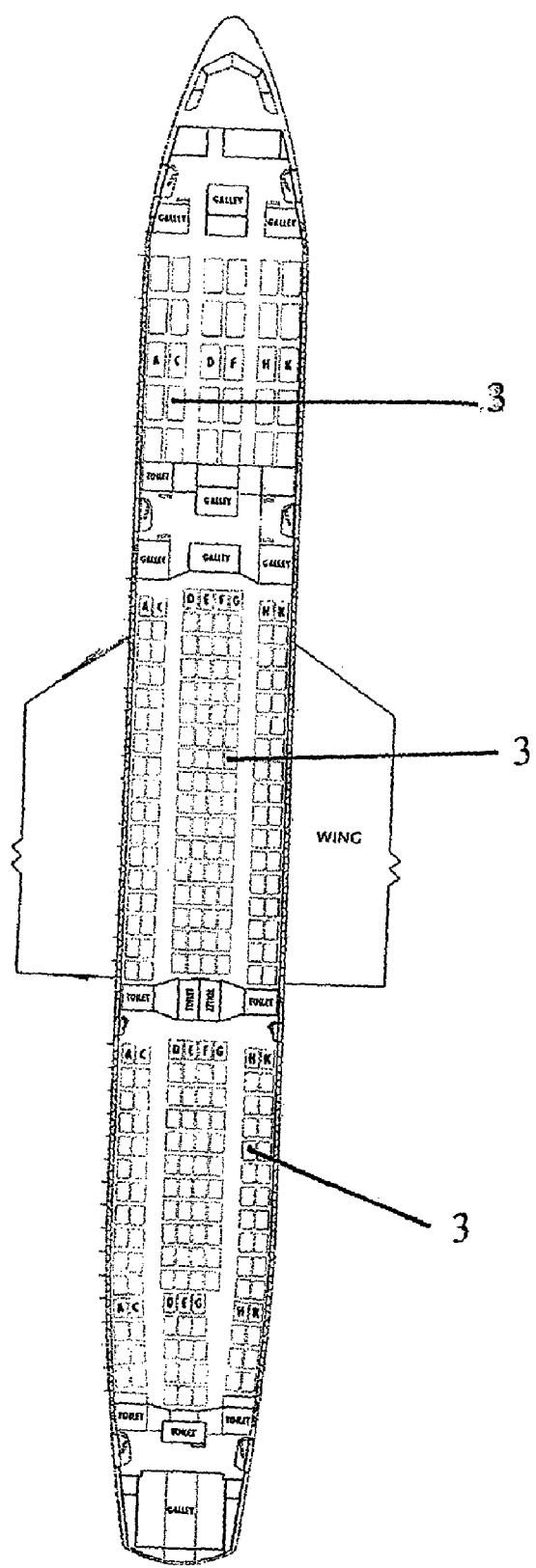
FIG. 6 is a schematic view of an example of an aircraft passenger cabin.

In addition, each reading light 11 includes a row of push buttons, generally identified by the numeral 37 in FIG. 3, that include on/off buttons and a brightness controller button.

Each reading light 11 also includes an image directing film (not shown) to shift the light focus in any desired direction. An example of an image directing film is a 3M product called Vikuity (Trade Mark) image directing film. It is a 0.15 mm thick film that re-directs any image or light source by 20°.

With the above-described arrangement, adjustment of the direction of light from the reading light 11 is possible via adjustment of the light 11 per se with respect to the monitor 9 of the assembly 5 and via adjustment of the assembly 5 with respect to the back 7 of the seat 3. Consequently, it is possible for a passenger to accurately direct a confined light beam onto a required viewing area, such as an extended tray table 35, as illustrated by the shaded region extending from the reading light 11 at the back of the middle seat shown in FIG. 1.

Many modifications may be made to the preferred embodiment of the present invention described above without departing from the spirit and scope of the present invention.

The invention claimed is:

1. An aircraft that includes an aircraft passenger cabin, a plurality of passenger seats arranged in rows in the cabin, with at least one passenger seat including a personalized visual display monitor assembly mounted to a back of the passenger seat for use by a passenger when the passenger is seated in a seat immediately behind the passenger seat, and with the visual display monitor assembly including a personalised reading light to direct light rearwardly from the seat and downwardly from the visual display monitor assembly into a space immediately in front of the passenger facing the back of the passenger seat,
    wherein the visual display monitor assembly is mounted to the back of the passenger seat so that the visual display monitor assembly is adjustable with respect to the passenger seat to facilitate adjustment of the direction of light from the reading light,
    the visual display monitor assembly and the reading light are powered by a common electrical circuit, and
    the direction of the light from the reading light is adjustable by the passenger independently of a position of the visual display monitor assembly.

2. The aircraft defined in claim 1 wherein the reading light is mounted so that the direction of light from the reading light can be adjusted upwardly and downwardly about a horizontal axis within a range of angles.

3. The aircraft defined in claim 1, wherein the reading light is adjustable with respect to other components of the visual display monitor assembly, thereby to facilitate adjustment of the direction of light from the reading light.

4. The aircraft defined in claim 1, wherein the visual display monitor assembly is mounted for pivotal movement to the passenger seat and the position of the assembly with respect to the seat can be varied between a first retracted position in which the assembly is generally parallel to the seat back and a second pivoted position in which the assembly is at an angle with respect to the seat back.

5. The aircraft defined in claim 1, wherein the reading light includes a plurality of light emitting diodes.

6. The aircraft defined in claim 1, wherein the reading light includes a plurality of light emitting diodes arranged in a line.

7. The aircraft defined in claim 6 wherein the reading light includes a tubular housing for the line of light emitting diodes and the housing is mounted to the seat back for rotation about the lengthwise extending axis of the tube, thereby to facilitate adjustment of the direction of light from the reading light.

8. The aircraft defined in claim 1, wherein the visual display monitor assembly includes a liquid crystal display monitor assembly.

9. A passenger seat for an aircraft that includes a personalized visual display monitor assembly mounted to a back of the passenger seat for use by a passenger when seated in a seat immediately behind the passenger seat, the visual display monitor assembly including a personalised reading light to direct light rearwardly from the passenger seat and downwardly from the visual display monitor assembly into a space immediately in front of the passenger facing the back of the passenger seat,
    wherein the visual display monitor assembly is mounted to the back of the passenger seat so that the assembly is adjustable with respect to the passenger seat to facilitate adjustment of the direction of light from the reading light,
    the visual display monitor assembly and the reading light are powered by a common electrical circuit, and
    the direction of the light from the reading light is adjustable by the passenger independently of a position of the visual display monitor assembly.

10. The seat defined in claim 9 wherein the reading light is mounted so that the direction of light from the reading light can be adjusted upwardly and downwardly about a horizontal axis within a range of angles.

11. The seat defined in claim 9, wherein the reading light is adjustable with respect to other components of the visual display monitor assembly, thereby to facilitate adjustment of the direction of light from the reading light.

12. The seat defined in claim 9, wherein the visual display monitor assembly is mounted for pivotal movement to the seat and the position of the assembly with respect to the passenger seat can be pivoted between a first retracted position in which the assembly is generally parallel to the seat back and a second pivoted position in which the assembly is at an angle with respect to the seat back.

13. The seat defined in claim 9, wherein the reading light includes a plurality of light emitting diodes.

14. The seat defined in claim 9, wherein the reading light includes a plurality of light emitting diodes arranged in a line.

15. The seat defined in claim 14 wherein the reading light includes a tubular housing for the line of light emitting diodes and the housing is mounted to the seat back for rotation about the lengthwise extending axis of the tube, thereby to facilitate adjustment of the direction of light from the reading light.

16. The seat defined in claim 9, wherein the visual display monitor assembly includes a liquid crystal display monitor assembly.

17. A passenger seat for an aircraft comprising:
    a display monitor assembly that is pivotably mounted to a back of the passenger seat and that comprises a monitor and a reading light mounted in the monitor,
    wherein the display monitor assembly is movable between a retracted position in which the monitor is flush with the back of the passenger seat, and an extended position in which a bottom of the monitor is extended at an angle with respect to the back of the passenger seat,
    wherein a direction of the light from the reading light is adjustable independently of the position of the display monitor assembly to direct the light downward from the display monitor assembly within a range of angles.

18. The passenger seat according to claim 17, further comprising a tube provided in a lower portion of the monitor in which the reading light is mounted, wherein the tube is rotatably mounted within the monitor to selectively direct the light from the reading light downward relative to a position of the monitor.

19. The passenger seat according to claim 18, wherein the monitor further comprises a plurality of push buttons which are configured to control the reading light.

20. The passenger seat according to claim 17, wherein the reading light comprises a plurality of light emitting diodes.

21. The passenger seat according to claim 17, wherein a direction of the light from the reading light is adjustable independently of the movement of the display monitor assembly, such that when the display monitor assembly is in the retracted position or the extended position, the direction of the light is adjustable.

22. The passenger seat according to claim 17, wherein a top of the display monitor assembly is pivotally mounted to the back of the passenger seat such that the display monitor assembly is moveable between the retracted position and the extended position, and the reading light is pivotally mounted in a bottom end of the monitor so that a direction of the light from the reading light is adjustable independently of a position of the monitor.

\* \* \* \* \*